United States Patent [19]

Shiraishi

[11] Patent Number: 4,676,710
[45] Date of Patent: Jun. 30, 1987

[54] APPARATUS FOR POSITIONING DISC-SHAPED FILM UNIT

[75] Inventor: Atsushi Shiraishi, Kanagawa, Japan

[73] Assignee: Fuji Photo Film Co., Ltd., Kanagawa, Japan

[21] Appl. No.: 673,695

[22] Filed: Nov. 21, 1984

[30] Foreign Application Priority Data

| Dec. 1, 1983 | [JP] | Japan | 58-227639 |
| Dec. 1, 1983 | [JP] | Japan | 58-227640 |
| Dec. 1, 1983 | [JP] | Japan | 58-227641 |
| Dec. 1, 1983 | [JP] | Japan | 58-227642 |
| Dec. 1, 1983 | [JP] | Japan | 58-227643 |

[51] Int. Cl.⁴ ............................................. B65H 5/14
[52] U.S. Cl. ..................................... 414/225; 355/75; 414/27; 414/32; 414/120; 414/908
[58] Field of Search .................. 414/222, 225, 744 R, 414/744 A, 32, 27, 416, 908, 120; 355/75, 76, 77; 354/319, 320, 322, 330; 269/61, 71; 294/82.28, 93

[56] References Cited

U.S. PATENT DOCUMENTS

| 2,875,909 | 3/1959 | Babick et al. | 414/27 |
| 4,120,232 | 10/1978 | Hoffman, Jr. | 294/82.28 X |
| 4,203,664 | 5/1980 | Clifton et al. | 355/75 X |
| 4,204,733 | 5/1980 | Modney et al. | 355/76 X |
| 4,545,675 | 10/1985 | Luscher | 355/76 |

Primary Examiner—L. J. Paperner
Assistant Examiner—Donald W. Underwood
Attorney, Agent, or Firm—Sughrue, Mion, Zinn, Macpeak & Seas

[57] ABSTRACT

A disc-shaped film unit positioning apparatus moves a disc-shaped film unit having a plurality of images circularly disposed thereon to each of the stations by rotating the film unit about the central axis of the apparatus, thereby allowing a predetermined operation to be carried out at each station. A support shaft for fitting thereon the disc-shaped film unit is disposed on a moving table which rotates about the central axis. The support shaft is coupled to a spindle of each station so as to transfer the disc-shaped film unit, thereby allowing the disc-shaped film unit to be automatically loaded onto the moving table and unloaded therefrom.

41 Claims, 12 Drawing Figures

APPARATUS FOR POSITIONING DISC-SHAPED FILM UNIT

BACKGROUND OF THE INVENTION

1. Field of the Invention:

The present invention relates to an apparatus for positioning to each of the work stations a disc-shaped film unit having a plurality of images circularly disposed thereon.

2. Description of the Prior Art:

A disc-shaped film unit is arranged such that a disc-shaped film is secured around a hub, and a multiplicity of images are circularly formed on the film. One example of this type of disc-shaped film unit is shown in the specification of Japanese Patent Laid-Open No. 22,799/1980. On the other hand, one example of a positioning apparatus which properly positions such disc-shaped film unit so as to effect printing by the use of the film unit is shown in the specification of International Application No. PCT/US79/00566.

The conventional disc-shaped film unit positioning apparatus has been arranged such that a moving table having a disc-shaped film unit mounted thereon rotates about the central axis of the apparatus such as to successively move the disc-shaped film unit to a plurality of work stations disposed around the central axis. At each work station, the disc-shaped film unit is rotated about the hub, thereby effecting inputting or outputting of magnetic information, a printing operation or other operations. In such conventional apparatus, however, the vibration of a motor or other device in an information processing station may be undesirably transmitted to the disc-shaped film unit at a printing station such as to prevent formation of a clear print.

SUMMARY OF THE INVENTION

In view of the above-described fact, it is a primary object of the present invention to provide a disc-shaped film unit positioning apparatus which has no possibility that any vibration or other movement which may interfere with operation may be transmitted to a disc-shaped film unit at any of the work stations, such as an information processing station, a station at which density information, for example, is photoelectrically detected, and a printing station.

To this end, according to the present invention, there is provided a disc-shaped film unit positioning apparatus in which a support shaft is rotatably supported by a moving table such as to fit into a hub bore in a disc-shaped film unit, and a vibration absorbing means is interposed between the support shaft and the moving table such that any detrimental vibration is absorbed, thereby effecting a printing operation and other operations without hindrance.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
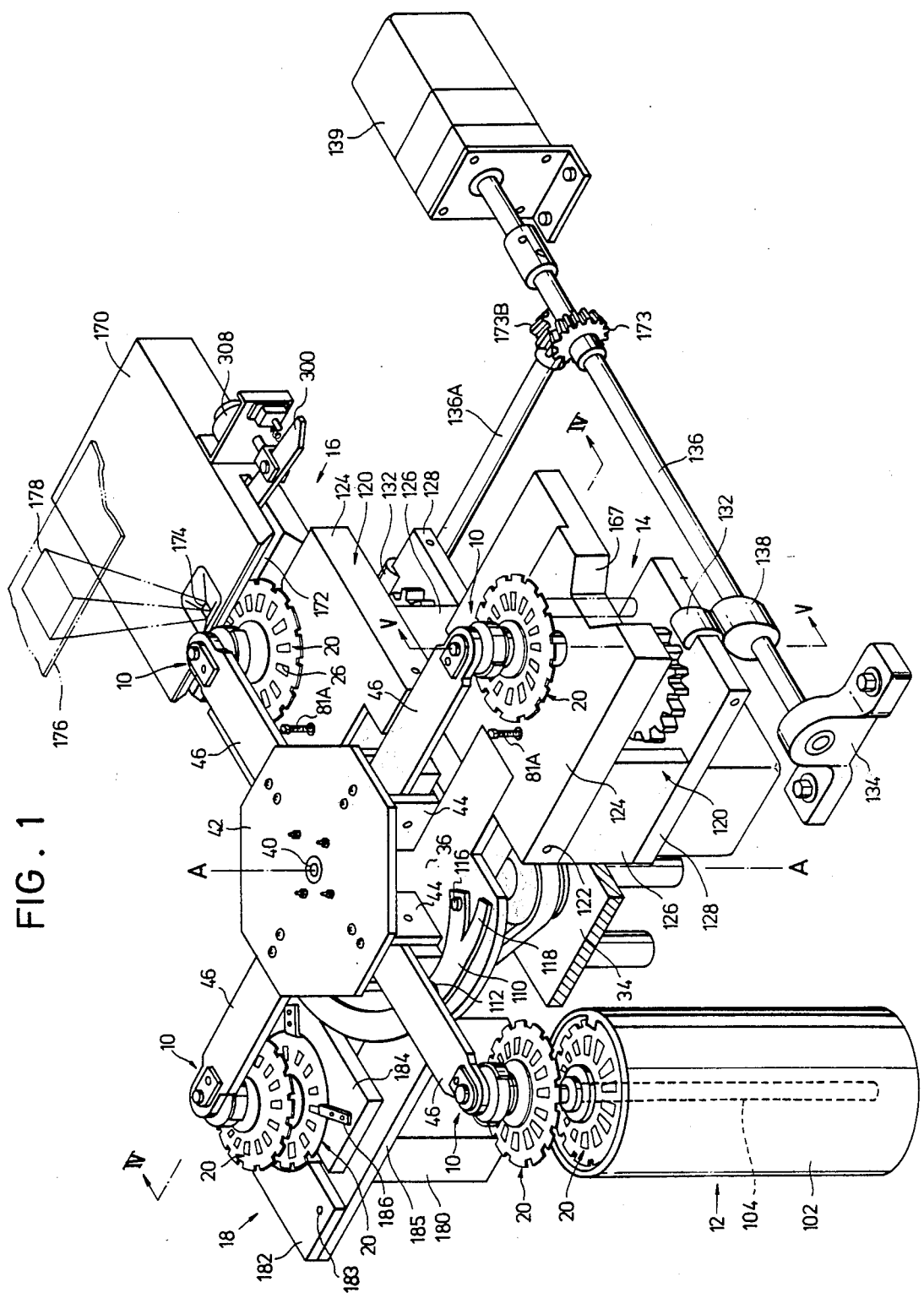
FIG. 1 is a perspective view of one embodiment of a disc-shaped film unit positioning apparatus in accordance with the present invention.
Figure 2:
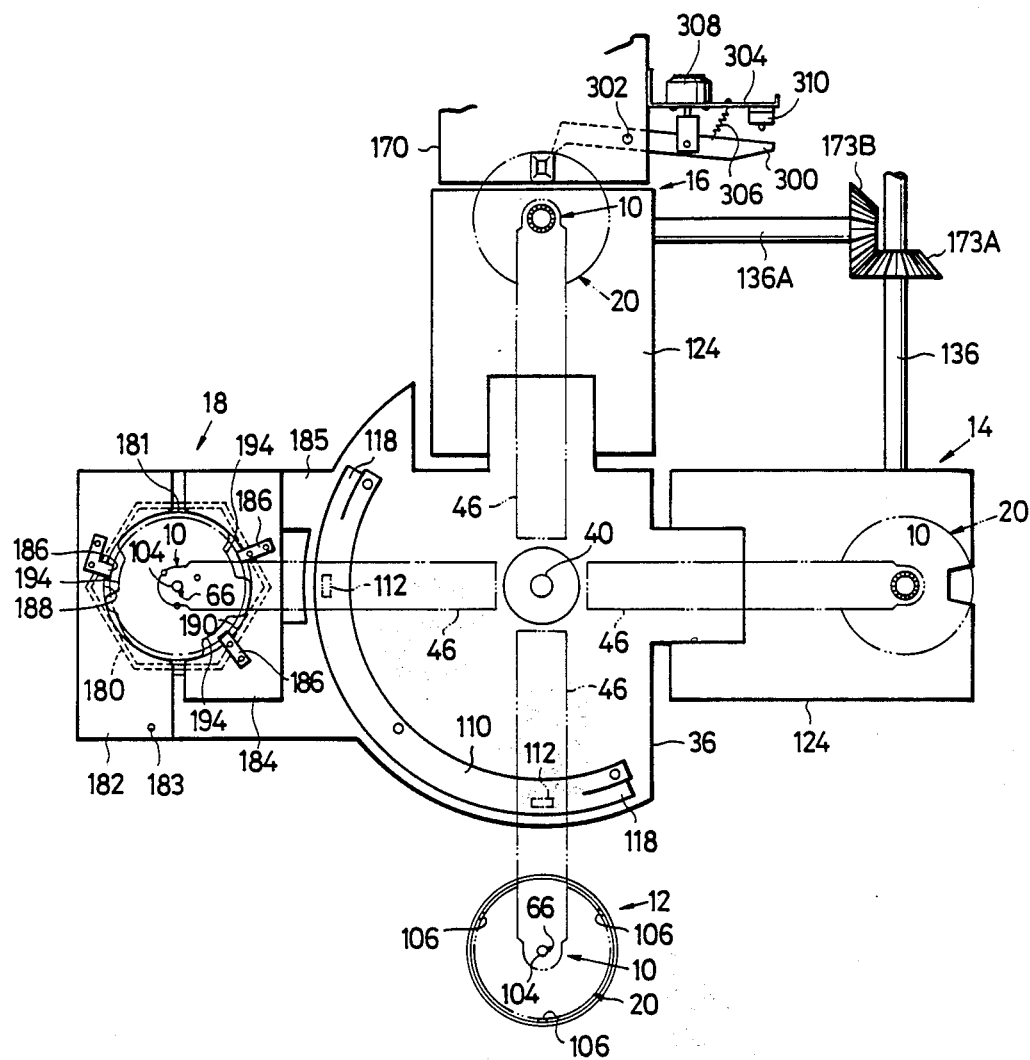
FIG. 2 is a plan view of an essential part of the disc-shaped film unit positioning apparatus shown in FIG. 1.

Referring first to FIGS. 1 and 2 which in combination show a disc-shaped film unit positioning apparatus in accordance with one embodiment of the present invention, four moving tables provided around a vertical central axis shown by the line A-A are adapted to rotate about the line A-A such as to move to various stations successively. According to this embodiment, the following four stations are provided around the central axis A-A at equal spacings: a film loading station 12, an information processing station 14, a printing station 16, and a film unloading station 18. By this arrangement, a plurality of disc-shaped film units 20 accumulated in the film loading station 12 are successively mounted on the moving tables 10 and are moved to the information processing station 14 and the printing station 16, where necessary operations are carried out. The disc-shaped film unit at the printing station is then moved to the film unloading station 18, where it is unloaded from the moving table.

Figure 3:
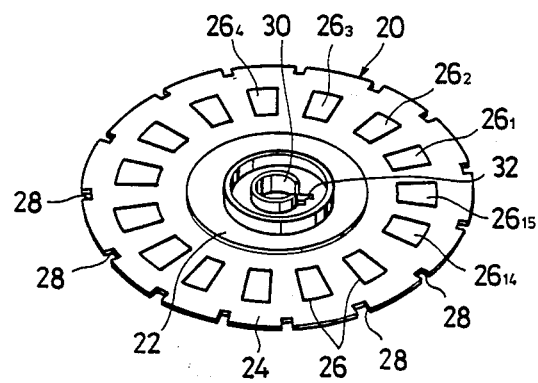
FIG. 3 is a perspective view of a disc-shaped film unit employed in the embodiment.

Each of the disc-shaped film units 20 employed in this embodiment is, as shown in FIG. 3, arranged such that a thin-walled film disk 24 is circularly secured around a disk-shaped hub 22 which also serves as a magnetic information recording medium. The film disk 24 is formed with a plurality (fifteen, in this embodiment) of image frames $26_1$ to $26_{15}$ around the hub 22 at equal spacings. The film disk 24 is further formed on the outer periphery thereof with rectangular positioning recesses 28, at equal spacings, each corresponding to an intermediate portion between the adjacent image frames 26. Moreover, the hub 22 has a hub bore 30 extending through the central axis thereof. The hub bore 30 is formed in a portion of the inner periphery thereof with a key groove 32 which serves to enlarge the inside diameter of the hub bore 30. The key groove 32 has an L shape as viewed from the axial direction of the hub bore 30. The key groove 32 makes it possible to discriminate between the face and back of the disc-shaped film unit 20 (see FIG. 7).

The mounting structure of the moving tables 10 will be described hereinunder with reference to FIG. 4.

A bracket 36 is stood on a base frame 34 of the positioning apparatus. The bracket 36 rotatably supports a vertical shaft 40 through a bearing 38. The vertical shaft 40 is disposed such that the axis thereof is coincident with the central axis A-A. To the upper end of the vertical shaft 40 is secured a rotary plate 42, also shown in FIG. 1, such as to rotate with the vertical shaft 40.

The rotary plate 42 is provided on the periphery thereof with four pairs of brackets 44 at equal spacings. By each pair of brackets 44, an arm 46 is pivotally supported at its intermediate portion through a horizontal pin 47. Each arm 46 has the corresponding moving table 10 provided at one of the ends thereof which is opposite to the vertical shaft 40. Through the other end of each arm 46 is extended an intermediate portion of a spring guide bolt 48 suspended from the rotary plate 42. A compression coiled spring 49 is interposed between the arm 46 and the lower end head of the spring guide bolt 48. Accordingly, the arm 46 is biased such as to pivot about the horizontal pin 47 in the direction in which the moving table 10 at the distal end of the arm 46 is lowered, but is at rest by abutting against a stopper pin 50 suspended from the rotary plate 42.

On the other hand, a pulley 51 is attached to the lower end of the vertical shaft 40. The pulley 51 is connected to a pulley 54 through a plurality of belts 52 and intermediate pulley 53. The pulleys 54 is attached to the output shaft of a motor 55 secured to the base frame 34. Accordingly, the vertical shaft 40 is rotated by the driving force of the motor 55. In this case, it is preferable to employ as the motor 55 a stepper motor so that each moving table 10 can be accurately positioned to each station. Moreover, each belt 52 is preferably constituted by a timing belt.

The moving table 10 attached to the distal end of each arm 46 will be explained hereinunder with reference to FIG. 5, which is a view taken along the line V—V in FIG. 1.

The arm 46 is formed in the vicinity of the distal end thereof with a circular bore 56 having a vertical axis. A bearing 57 is received in the circular bore 56 and is prevented from coming off by means of a retainer plate 58.

Figure 6:
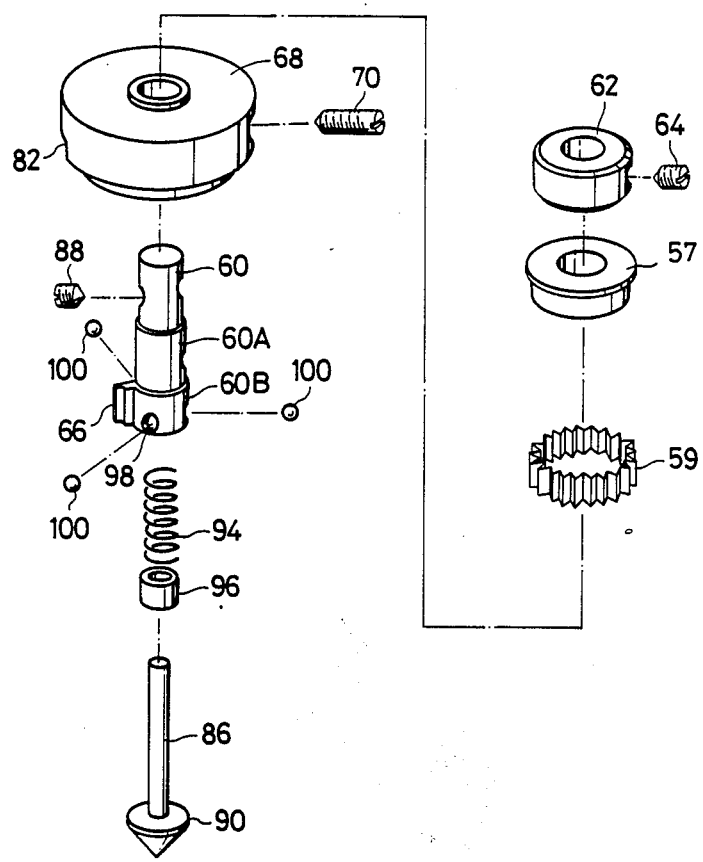
FIG. 6 is an exploded perspective view of a part of FIG. 5.

Between the outer periphery of the bearing 57 and the circular bore 56 is interposed a resilient member 59 which is shown in detail in FIG. 6. The resilient member 59 in this embodiment is constituted by a leaf spring which is bent in zigzag and is connected at both ends thereof such as to form a ring shape, thereby allowing the resilient member 59 to absorb any displacement or vibration which radially acts between the bearing 57 and the circular bore 56. Besides the above-described leaf spring, it is possible to employ a ring-shaped rubber, sponge, synthetic resin and so forth.

A support shaft 60 is rotatably supported by the bearing 57 while extending therethrough. A stopper ring 62 is secured by a screw 64 to the upper end of the support shaft 60 which projects beyond the upper side of the bearing 57, whereby the support shaft 60 is prevented from coming off from the bearing 57.

The intermediate portion of the support shaft 60 is constituted by an enlarged-diameter portion 60A so that the support shaft 60 is prevented from upwardly coming off from the bearing 57. On the other hand, the lower end portion of the support shaft 60 is constituted by an insertion portion 60B which is larger in diameter than the enlarged-diameter portion 60A. From the insertion portion 60B is projected a key 66 having an L-shaped cross-section orthogonal to the axis of the support shaft 60 in correspondence with the key groove 32 of the disc-shaped film unit 20 which is fitted on the outer periphery of the insertion portion 60B. By virtue of the key 66, the disc-shaped film unit 20 fitted on the support shaft 60 is made unable to rotate relative to the support shaft 60.

A stopper ring 68 has previously been attached to the enlarged-diameter portion 60A before the support shaft 60 is inserted into the bearing 57. More specifically, the stopper ring 68 has a disk shape and is penetrated at its central portion by the enlarged-diameter portion 60A of the support shaft 60. Further, a screw 70 which is radially screwed into the stopper ring 68 firmly fixes together the stopper ring 68 and the support shaft 60, whereby the stopper ring 68 is allowed to rotate with the support shaft 60.

Figure 5:
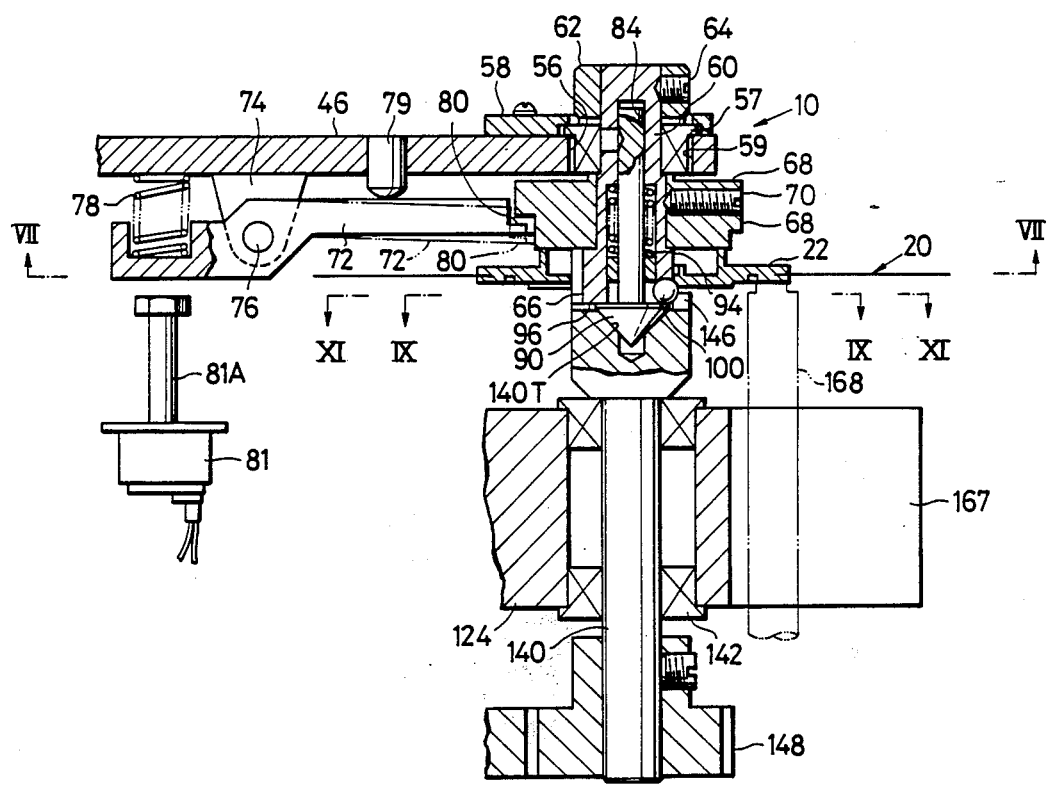
FIG. 5 is an enlarged sectional view of a part of FIG. 4.
Figure 7:
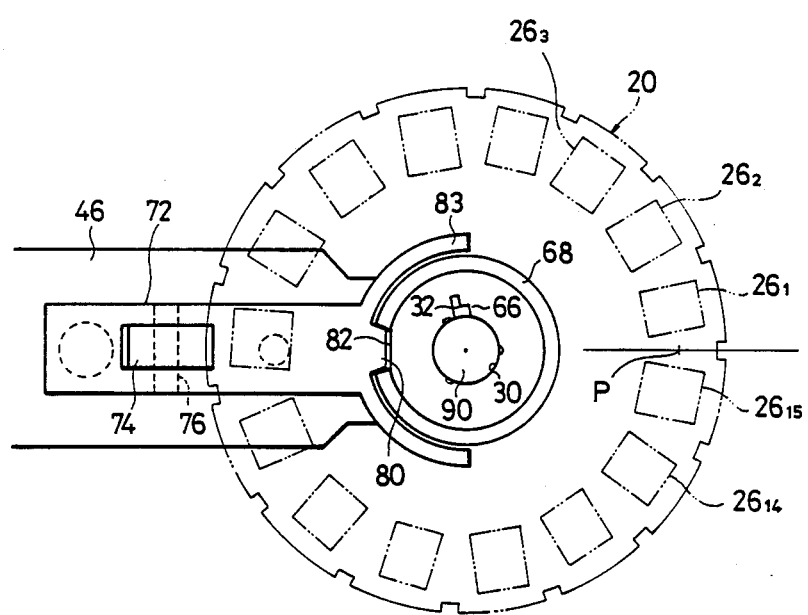
FIG. 7 is an illustration of a part of the disc-shaped film unit positioning apparatus shown in FIG. 1 as viewed in the direction of the arrows VII—VII of FIG. 5.

The stopper ring 68 is, as shown in FIG. 5, disposed such as to oppose a lever 72 which is disposed below the arm 46. The lever 72 is pivotally supported at its intermediate portion through a pin 76 by a bracket 74 projecting from the bottom surface of the arm 46. A compression coiled spring 78 is interposed between the arm 46 and one of the ends of the lever 72. By the biasing force of the compression coiled spring 78, the lever 72 abuts against a stopper 79, and a projection 80 formed at the other end of the lever 72 engages with a recess 82 formed at one position on the circumference of the stopper ring 68 as shown in FIG. 7 also. Thus, the projection 80 constitutes a retainer means in a normal state by stopping the rotation of the support shaft 60 through the stopper ring 68. However, when the lever 72 pivots clockwise by a slight amount as shown by a two-dot chain line in FIG. 5 against the biasing force of the compression coiled spring 78, the projection 80 comes out of the recess 82, thus enabling the support shaft 60 to rotate.

Under the state wherein the projection 80 is in engagement with the recess 82 as shown in FIG. 7, the disc-shaped film unit 20 retained on the moving table 10 is positioned such that an intermediate portion between the image frames $26_1$ and $26_{15}$ is coincident with an operation axis P. More specifically, when any of the image frames comes coincident with an extension of an imaginary straight line tying together the axis of the moving table 10 and the central axis A-A, the line tying together the image frame and the extension is defined as the operation axis P. However, in a state wherein the moving table 10 retains the disc-shaped film unit 20 while preventing rotation of the latter, no image frame exists on the operation axis P. In this case, therefore, the disc-shaped film unit 20 is rotated by a slight amount, whereby the image frame $26_1$ or $26_{15}$ is allowed to coincide with the operation axis P.

As shown in FIG. 7, a semicircular release fork 83 projects from the distal end of the lever 72 such as to be disposed around the stopper ring 68. The release fork 83 serves to push down the disc-shaped film unit 20 retained by the support shaft 60 such that the disc-shaped film unit 20 is removed from the support shaft 60 when the lever 72 is further pivoted from the position shown by the two-dot chain line in FIG. 5.

The pivoting of the lever 72 is effected in such a manner that the lever 72 is pressed by a plunger 81A of a solenoid 81 as a cancelling means shown in FIG. 5. The solenoid 81 is provided on each station and is adapted to pivot the lever 72 to the position shown by the two-dot chain line in FIG. 5, thereby allowing the support shaft 60 to rotate. The solenoid 81 provided on the film unloading station 18 is, however, made larger in stroke than the solenoids on the other stations so that the disc-shaped film unit 20 can be pressed down such as to be taken out from the moving table 10.

Figure 8:
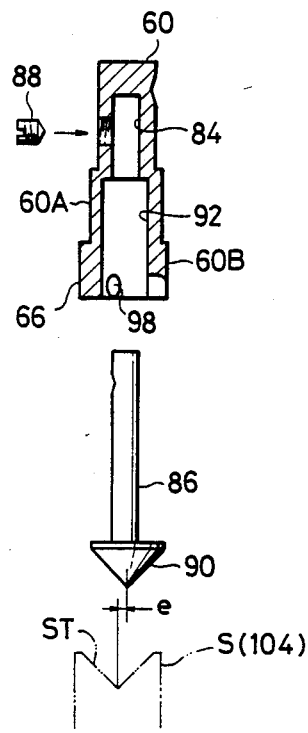
FIG. 8 is an exploded view of a part of FIG. 5.

The support shaft 60 is, as shown in FIGS. 5 and 8, formed with a smaller-diameter hole 84 of a predetermined length which extends from the lower end of the support shaft 60. Into the smaller-diameter hole 84 is inserted a smaller-diameter support shaft 86 from the lower end of the support shaft 60. An upper end portion of the smaller-diameter support shaft 86 is secured to the support shaft 60 by means of a screw 88. To the lower end of the smaller-diameter support shaft 86 is secured a conical member 90 gradually reduced in diameter toward the lower side thereof, the conical member 90 being disposed below the lower end of the support shaft 60. The maximum diameter of the conical member 90 is set such as to be smaller than the diameter of the hub bore 30 of the disc-shaped film unit 20, thereby allowing a fitting ascension operation in which the disc-shaped film unit 20 is passed over the conical member 90 and is fitted on the support shaft 60. Further, the taper surface of the conical member 90 serves to facilitate positioning of the conical member 90 with respect to another device. More specifically, the conical member 90 is allowed to move slightly in the horizontal direction, together with the bearing 57, by means of the resilient member 59 disposed on the outer periphery of the bearing 57. Accordingly, even if there is a slight eccentricity e between the conical member 90 and another shaft S to be coaxially coupled thereto such as that shown by the imaginary line in FIG. 8, if the shaft S has a junction surface which is constituted by a guide surface ST, such as a taper surface, then it is possible for the conical member 90 to coaxially couple to the shaft S by following the guide surface ST.

Below the smaller-diameter hole 84, an expanded-diameter hole 92 is formed which has an inside diameter larger than that of the smaller-diameter hole 84. A compression coiled spring 94 is fitted on the outer peripheral part of the smaller-diameter support shaft 86 at the inner periphery of the enlarged-diameter hole 92. Further, a ring 96 is fitted on the smaller-diameter support shaft 86 below the compression coiled spring 94 and is biased toward the conical member 90 by the biasing force of the compression coiled spring 94. The lower end of the ring 96 abuts against three balls 100. These balls 100 are respectively received in three guide bores 98 radially extending through the support shaft 60. Each of the guide bores 98 is reduced in the inside diameter at the end thereof which is remote from the smaller-diameter support shaft 86, whereby each ball 100 is prevented from moving outwardly, that is, in a direction in which it comes off from the smaller-diameter support shaft 86. Moreover, the ring 96 abuts against an inner portion of each ball 100, thereby urging the ball 100 such that it is moved outwardly.

Figure 9:
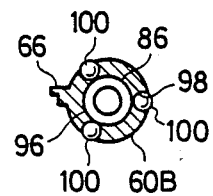
FIG. 9 is a sectional view of a support shaft taken along the line IX—IX of FIG. 5.

Each of the balls 100 has, as shown in FIG. 9 also, a portion thereof projecting beyond the outer peripheral part of the support shaft 60. Consequently, when an external force is applied to the balls 100, they push up the ring 96 against the biasing force of the compression coiled spring 94 and inwardly move in the associated guide bores 98 such as to be able to withdraw inwardly of the outer periphery of the support shaft 60.

Accordingly, when the disc-shaped film unit 20 is upwardly pushed through the conical member 90, the hub 22 of the disc-shaped film unit 20 temporarily forces these balls 100 into the associated guide bores 98 and comes to rest when abutting against the lower end of the stopper ring 68 as shown in FIG. 5. Under this state, the balls 100 are projected again by the biasing force of the compression coiled spring 94 such as to be located below the hub 22; hence, there is no possibility that the disc-shaped film unit 20 may undesirably come off from the support shaft 60. In consequence, the balls 100 and the compression coiled spring 94 in combination constitute a means for maintaining a state wherein the disc-shaped film unit 20 is attached on the support shaft 60.

Figure 10:
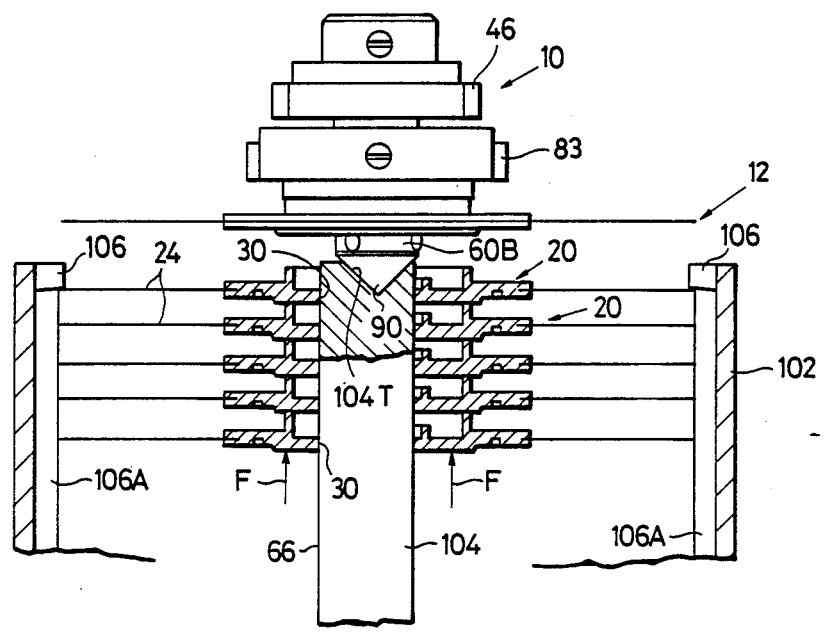
FIG. 10 is a sectional view of a film loading station.

As shown in FIGS. 1 and 2, the film loading station 12 is provided with a cylindrical film container 102 having a vertical axis. The film container 102 has, as shown in FIG. 10, a spindle 104 axially extending therethrough. A multiplicity of disc-shaped film units 20 are coaxially housed in the film container 102 while fitting at their hub bores 30 on the spindle 104. The upper most disc-shaped film unit 20 among these film units 20 is prevented from upwardly coming off by means of stopper pawls 106 which inwardly project from the upper end of the film container 102. The respective outer peripheries of the disc-shaped film units 20 abut against stopper pawl suspending portions 106A which are provided below the stopper pawls 106 and downwardly project in the axial direction of the film container 102 so as to prevent the disc-shaped film units 20 from moving radially, thereby preventing off-set of the spindle 104. However, when the conical member 90 of the moving table 10 is coupled to a conical surface 104T formed at the upper end of the spindle 104, the lower most disc-shaped film unit 20 receives an upwardly pushing force F. Consequently, the outer peripheral portion of the film disk 24 of the uppermost disc-shaped film unit 20 is elastically deformed such as to get over the stopper pawl 106, so that the uppermost disc-shaped film unit 20 is fitted on the support shaft 60 of the moving table 10 so as to be retained. Thus, the conical member 90 and the conical surface 104T in combination constitute a coupler means for coupling together the support shaft 60 and the spindle 104, thereby smoothly transferring the disc-shaped film unit 20. In this case, since the spindle 104 is also formed with a key 66, the disc-shaped film units 20 are transferred to the moving table 10 in the same rotational position.

It is to be noted that it becomes possible to effect a continuous operation by successively attaching to the film loading station 12 film containers 102 each containing a plurality of previously developed disc-shaped film units 20.

As described above, the moving table 10 is horizontally moved by pivoting of the arm 46 such as to be positioned to the film loading station 12, and the conical member 90 is fitted with the conical surface 104T formed at the upper end of the spindle 104. In this case, in order to properly fit the conical member 90 with the conical surface 104T and in order that the disc-shaped film unit 20 is rotated about the central axis A-A after the moving table 10 has received the disc-shaped film unit 20, it is necessary for the moving table 10 to move up and down in the substantially vertical direction above the film loading station 12 so that the conical member 90 is prevented from interfering with the upper end of the spindle 104, since the spindle 104 is secured to the container 102. For this purpose, an elevating plate 110 as an elevating means is provided on the base frame 34 as shown in FIG. 1. In correspondence with the elevating plate 110, a roller 112 is rotatably supported at an intermediate portion of the arm 46 as shown in FIG.

4 in detail. The roller 112 is rotatably supported by a support shaft 114 projecting from an intermediate portion of the arm 46 toward the moving table 10 such that the outer periphery of the roller 112 opposes the elevating plate 110.

The elevating plate 110 has a semicircular planar shape with its center at the central axis A-A and with a predetermined radius. The elevating plate 110 has a slanting surface 118 at each of the ends thereof so as to be able to smoothly move the roller 112 up and down when the rotary plate 42 is rotated.

The elevating plate 110 is secured by the respective upper ends of a plurality of pins 116. These pins 116 extend through both the bracket 36 and a sleeve 115 stood on the bracket 36. The pins 116 are vertically moved by the driving force of a solenoid 117 secured to the bracket 36. Accordingly, when raised, the elevating plate 110 causes the arms 46 at the film loading station 12 and the film unloading station 18 to pivot about the associated horizontal pins 47 in the state wherein the moving tables 10 are at rest above these stations 12, 18. As a result, the conical member 90 of each moving table 10 is able to couple with the conical surface 104T of the spindle 104 without interfering with the peripheral edge of the upper end of the spindle 104.

In the case of elevating a container 102 having the spindle 104 fixed thereto instead of raising the moving table 10 in order to avoid an interference between the conical member 90 and the upper end peripheral edge of the spindle 104, the structure for elevating the container 102 becomes complicated.

The information processing station 14 shown in FIG. 1 is provided with a driving unit 120. The driving unit 120 is adapted to rise such as to couple with the support shaft 60 of the moving table 10 and to apply a driving force to the support shaft 60, thus causing the disc-shaped film unit 20 to rotate about the hub 22.

Figure 4:
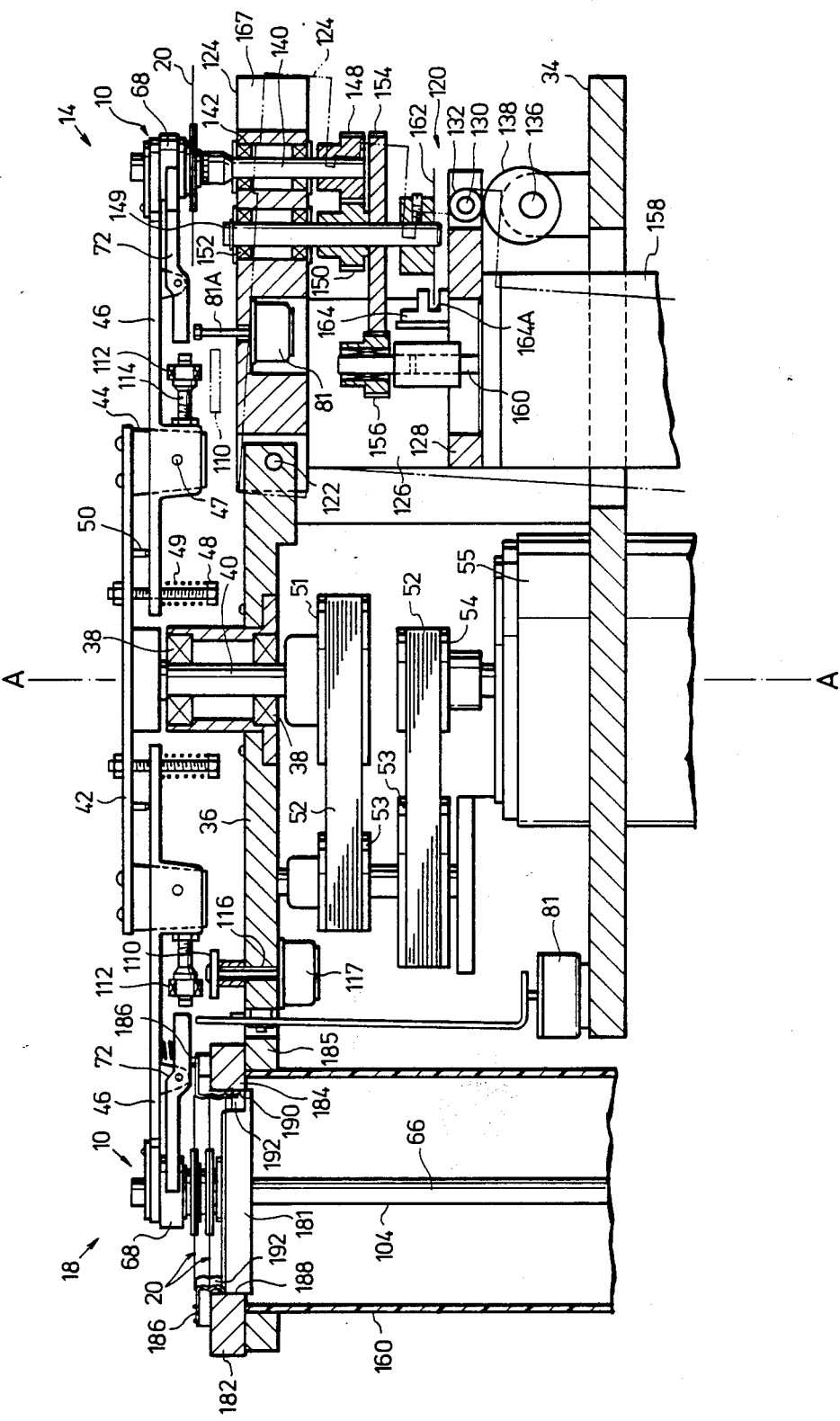
FIG. 4 is a sectional view taken along the line IV—IV of FIG. 1.

As shown in FIG. 4, the driving unit 120 has a swing bracket 124 which is pivotally supported by the bracket 36 through a horizontal pin 122. To the swing bracket 124 is secured a motor supporting plate 128 through a connecting plate 126. The motor supporting plate 128 rotatably supports a roller 132 through a shaft 130. The roller 132 is contacted by a cam 138 of a shaft 136 which is rotatably supported by the base frame 34 through a bearing 134 (FIG. 1). The cam 138 is adapted to cause the swing bracket 124 to swing about the horizontal pin 122, from a tilting position shown by the two-dot chain line in FIG. 4 to a horizontal position shown by the solid line, through both the motor supporting plate 128 and the connecting plate 126 by means of the driving force of a motor 139 connected to the shaft 136.

Figure 11:
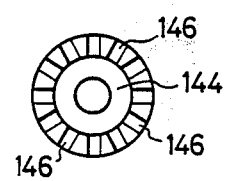
FIG. 11 is a plan view of a driving shaft as viewed in the direction of the arrows XI—XI of FIG. 5.

The swing bracket 124 rotatably supports through a bearing 142 a driving shaft 140 whose axis is vertical when the swing bracket 124 is in a horizontal state. The driving shaft 140 is formed at the upper end thereof with a conical surface 140T as shown in FIG. 5. The conical surface 140T is adapted to fit with the conical member 90 of the smaller-diameter support shaft 86 when the swing bracket 124 is in a horizontal state. The driving shaft 140 is further formed along the periphery of the conical surface 140T with a plurality of recesses 146 extending radially as also shown in FIG. 11. These recesses 146 are adapted to engage with the key 66 of the support shaft 60 when the swing bracket 124 is in a horizontal state such as to connect the driving shaft 140 to the support shaft 60. The recesses 146 also serve as relief grooves for preventing any external force from being applied to the three balls 100 which are received in the corresponding guide bores 98 of the support shaft 60 such as to project from the outer peripheral portion of the support shaft 60. Accordingly, as the driving shaft 140 rotates when the swing bracket 124 is in a horizontal state, the support shaft 60 and the disc-shaped film unit 20 are rotated.

The driving shaft 140 has a gear 148 secured to the lower end portion thereof. The gear 148 is meshed with a gear 150 secured to a shaft 149. The shaft 149 has its upper end portion rotatably supported by the swing bracket 124 through a bearing 152. The shaft 149 has a gear wheel 154 secured to an intermediate portion thereof. The gear wheel 154 is meshed with a pinion 156. The pinion 156 is connected to an output shaft 160 of a motor 158 which is secured to the motor supporting plate 128. Thus, the motor 158 is able to transmit the rotational force thereof to the driving shaft 140 through the pinion 156, the gear wheel 154 and the gears 150, 148.

Further, a disc 162 is secured to the lower end portion of the shaft 149 such as to rotate with the shaft 149. The disc 162 has a portion thereof inserted into a slit 164A of a detection switch 164 which is mounted on the motor supporting plate 128. Thus, the detection switch 164 detects a rotational position of the driving shaft 140 by detecting, for example, a notch formed in the disc 162 or a magnetic signal. According to the result of detection, a control means, not shown, controls the motor 158 such that the disc-shaped film unit 20 is continuously or intermittently rotated to a desired position.

The swing bracket 124 is formed in its distal end portion with a notch 167 such that an information input/output arm 168 is able to approach the hub 22 of the disc-shaped film unit 20 through the notch 167, as shown in FIG. 5, when the swing bracket 124 is in a horizontal state. The information input/output arm 168 is able to magnetically input to the hub 22 signals representing the number of prints to be produced, the image printing condition correction data, etc. delivered from an information input/output unit, not shown. Otherwise, the information input/output arm 168 is able to read out magnetic signals recorded on the hub 22.

A light source and a photosensor (not shown) are disposed such as to face the image frame 26 which corresponds to the notch 167 formed at the distal end portion of the swing bracket 124. Thus, the information about density of the image of each of the image frames 26 formed by the light transmitted therethrough is obtained by means of the photosensor, and the calculated printing condition correction data, for example, is input to the hub 22 or is delivered to the printing station 16.

The number of prints to be produced and the printing condition correction data for each image frame 26 which have previously been input to the hub 22 of the disc-shaped film unit 20 can be read out therefrom and delivered to the printing station 16.

It is to be noted that the swing bracket 124 is provided with the above-described solenoid 81 for pivoting the lever 72 of the moving table 10. The solenoid 81 is adapted to pivot the lever 72 in the state where the support shaft 60 of the moving table 10 is coupled to the driving shaft 140, thereby allowing the support shaft 60 to rotate.

The printing station 16 will be explained hereinunder.

The printing station 16 is provided with a film inserting frame 170 having a slit 172 which is horizontally formed in a portion of the frame 170. The film disk 24 of the disc-shaped film unit 20 retained on the moving table 10 is horizontally moved such as to be inserted into the slit 172.

The printing station 16 is also provided with a driving unit 120 similar to that in the information processing station 14. The driving unit 120 is able to connect to the moving table 10 having moved to the printing station 16, thereby rotating the disc-shaped film unit 20 by a desired rotational angle. The driving unit 120 of the printing station 16 is adapted to be able to obtain a driving force from a shaft 136A having a bevel gear 173B which is meshed with a bevel gear 173A secured to the shaft 136 of the motor 139.

Further, the film inserting frame 170 is formed with an aperture 174 opposing the operation axis P of the film disk 24 retained on the moving table 10. A light-emitting means, not shown, is provided below the aperture 174. The light emitted from the light-emitting means is passed through each image frame 26 of the film disk 24 such as to form an image plane 178 on a photographic paper 176 above the printing station 16 by means of a lens (not shown) which is disposed according to need. The photographic paper 176 has both end portions thereof respectively wound up on a supply reel and a take-up reel and is successively fed out as printing is effected.

Figure 12:
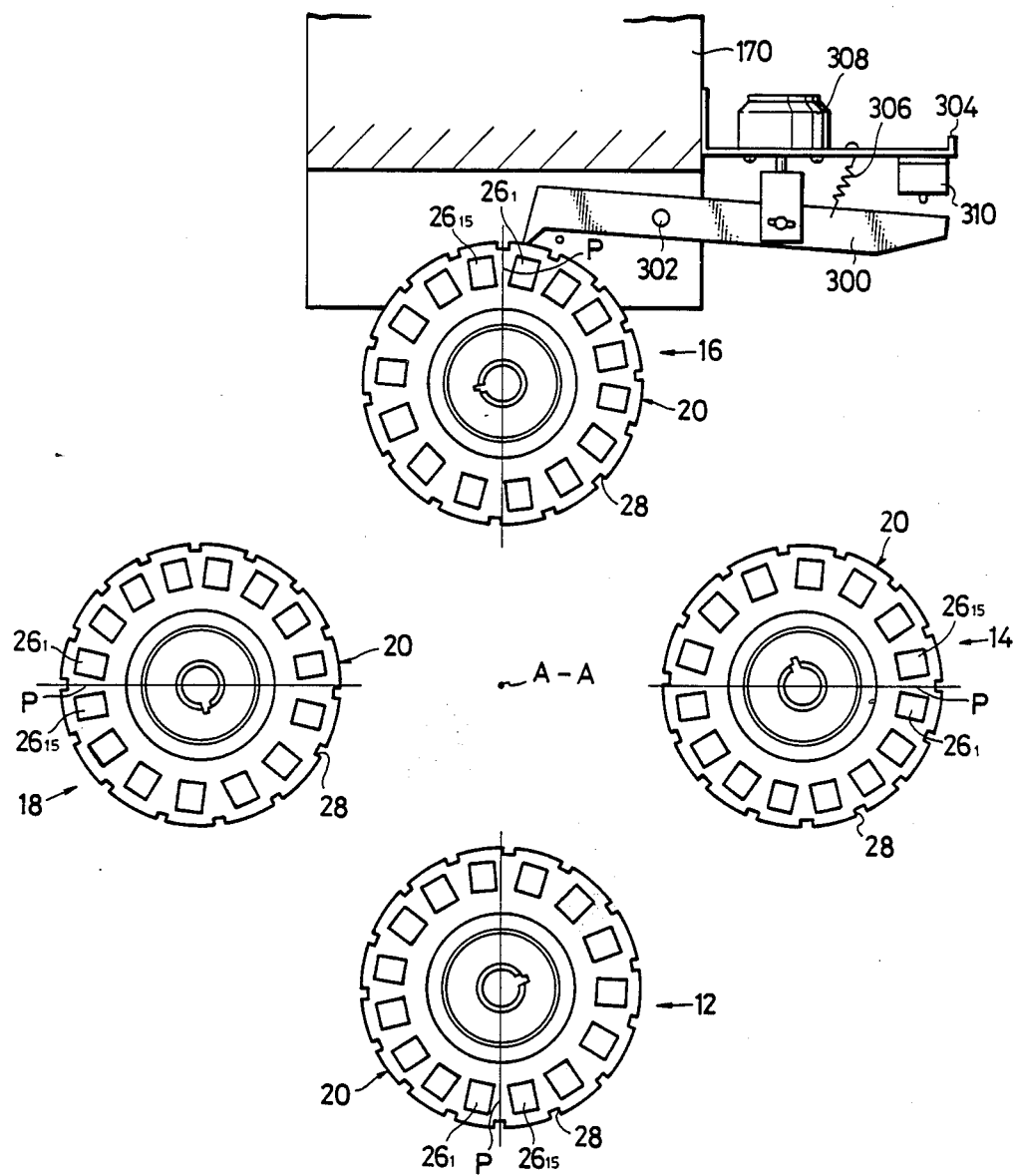
FIG. 12 is a plan view showing a state wherein a disc-shaped film unit has reached each of the stations.

The printing station 16 is further provided with a positioning arm 300 as also shown in FIGS. 2 and 12. The positioning arm 300 is disposed such as to oppose the positioning recesses 28 formed along the outer periphery of the disc-shaped film unit 20. The arm 300 has an intermediate portion thereof pivotally supported by the film inserting frame 170 through a pin 302. Further, a tension coiled spring 306 is interposed between one of the ends of the arm 300 and a bracket 304 stood on the film inserting frame 170. Thus, the other end of the arm 300 is pressed on the outer periphery of the disc-shaped film unit 20 by the biasing force of the spring 306. In addition, the arm 300 is disposed such that, when any one of the image frames 26 coincides with the operation axis P, the distal end of the arm 300 is engaged with one of the positioning recesses 28, thereby preventing rotation of the disc-shaped film unit 20.

Accordingly, as shown in FIG. 12, in the state wherein the disc-shaped film unit 20 has reached the printing station 16, an intermediate portion between the adjacent image frames coincides with the operation axis P; the arm 300, therefore, coincides with an intermediate portion between the adjacent recesses 28.

The arm 300 is further connected to the output shaft of a solenoid 308 which is attached to the bracket 304. When printing of the image frame coincident with the operation axis P has been completed, the solenoid 308 is energized by means of a controller, not shown, such as to cause the arm 300 to pivot against the biasing force of the tension coiled spring 306, thereby allowing rotation of the disc-shaped film unit 20.

It is to be noted that the pivoting state of the arm 300 is detected by a limit switch 310 attached to the bracket 304.

The film unloading station 18 has an unloaded-film container 180 which is disposed below the moving table 10 such as to be coaxial therewith. The container 180 is, as shown in FIG. 10, provided with a spindle 104 in a manner similar to that in the film loading station 12. To the conical surface formed at the upper end of the spindle 104 is coupled the conical member 90 of the support shaft 60, whereby the disc-shaped film unit 20 finished with printing is received from the moving table 10 by pivoting of the lever 72.

The unloaded-film container 180 has a hexagonal column-like shape as viewed in the axial direction thereof, as clearly shown in FIG. 2. The container 180 is arranged such that the disc-shaped film units 20 are successively inserted thereinto from the upper-end opening facing the moving table 10. An end plate 181 is fitted on the spindle 104 such as to be slidable in the axial direction thereof. The end plate 181 is adapted to produce a predetermined frictional resistance between the same and the spindle 104 when sliding thereon. The end plate 181 is gradually lowered when the disc-shaped film units 20 are successively inserted into the container 180 from the upper end of the spindle 104.

A pair of guide brackets 182, 184 are disposed on the upper side of the unloaded-film container 180. These guide brackets 182, 184 are connected to the bracket 36 through an elongated bracket 185. The guide brackets 182, 184 are respectively formed in their opposing surfaces with semicircular openings 188, 190 for providing a communication between the upper-end opening of the container 180 and the moving table 10. The circular bore defined by the pair of semicircular openings 188, 190 has a diameter slightly larger than the outside diameter of the end plate 181. The arrangement is such that, at its uppermost raised position, the end plate 181 is inserted into the circular bore defined by the semicircular openings 188, 190. It is to be noted that the guide bracket 182 is able to pivot about a pin 183 with respect to the elongated bracket 185, thereby facilitating attaching and detaching of the unloaded-film container 180.

Unlike the film container 102 in the film loading station 12, the unloaded-film container 180 is required to allow the disc-shaped film units 20 to successively come off from the spindle 104 by virtue of their own weight after the container 180 has been inverted in the subsequent step. For this reason, the container 180 is not provided at its upper end with any stopper pawls such as those of the film container 102. In place of the stopper pawls, however, a plurality (three, in this embodiment) of stopper pawls 186 are attached to the guide brackets 182, 184. Each of the stopper pawls 186 has, as clearly shown in FIG. 4, a retainer arm 192 extending from the distal end thereof in parallel to the spindle 104. The retainer arm 192 is preferably made from a resilient member such as a leaf spring. The retainer arm 192 is formed at its intermediate portion with irregularities which are constituted by projections and recesses such as to correspond to the pitch of the disc-shaped film units 20 piled on the spindle 104.

The inscribed envelope circle defined by the respective retainer arms 192 of the stopper pawls 186 has a diameter slightly smaller than the outside diameter of the disc-shaped film units 20, whereby it is possible to apply a resistance to the disc-shaped film units 20 as they pass. Accordingly, even when the end plate 181 is lowered by insertion of a multiplicity of disc-shaped film units 20 into the container 180, the retainer arms 192 retain the respective outer peripheries of the disc-shaped film units 20, thereby preventing off-set of the spindle 104. Further, the stopper pawls 186 are, as shown in FIG. 2, disposed such as to respectively correspond to notches 194 formed along the outer periphery of the end plate 181 so as not to obstruct the vertical movement of the end plate 181.

The following is a description of the operation of the above-described embodiment.

To the film loading station 12 is set the film container 102 containing a multiplicity of disc-shaped film units 20 previously subjected to development. With the elevating plate 110 placed at its lowered position, the conical member 90 of the moving table 10 is vertically lowered such as to be coupled to the upper end of the spindle 104 as shown in FIG. 10. Simultaneously, the disc-shaped film units 20 in the film container 102 are raised by the pushing-up force F applied thereto by a pushing-up device, not shown, whereby the uppermost disc-shaped film unit 20 is fitted on the outer periphery of the support shaft 60 and is retained thereon by means of the balls 100.

Since the support shaft 60 is coaxially coupled to the spindle 104 by virtue of deformation of the resilient member 59, the disc-shaped film units 20 are smoothly raised. Further, the key 66 of the spindle 104 permits the disc-shaped film units 20 to be transferred to the support shaft 60 in the same rotational position.

Under this state, the disc-shaped film unit 20 is placed such that the portion thereof between the image frames $26_1$, $26_{15}$ is coincident with the operation axis P as shown in FIG. 12.

Next, the elevating plate 110 is raised, so that the arm 46 above the film loading station 12 is vertically raised, thus causing the conical member 90 to separate from the upper end of the spindle 104. As the moving table 10 is raised, the rotary plate 42 is rotated by the driving force of the motor 55, whereby the moving table 10 above the film loading station 12 is moved to the information processing station 14. Under this state also, the position of the disc-shaped film unit 20 relative to the operation axis P is unchanged as shown in FIG. 12.

When the moving table 10 has reached the information processing station 14, the motor 139 causes the cam 138 to rotate as shown in FIG. 4. Consequently, the swing bracket 124 rises such as to take a horizontal position, whereby the driving shaft 140 coincides with the conical member 190, and the upper end of the driving shaft 140 is coupled to the support shaft 60. Simultaneously, the lever 72 is slightly pivoted by the driving force of the solenoid 81, thereby allowing the support shaft 60 to rotate. Under this state, as the motor 158 rotates, the driving shaft 140 is rotated by the rotational force of the motor 158, so that the disc-shaped film unit 20 rotates with the driving shaft 140. Then, the information input/output arm 168 reads out the information recorded on the hub 22 of the film disk 24 or inputs information to the hub 22.

In this case, the information input/output operation is accurately and speedily effected, since it is possible to commence the operation from the position of the image frame $26_1$ or $26_{15}$.

During such information processing operation, there is no possibility that the disc-shaped film unit 20 may be trembled such as to obstruct the operation, since the resilient member 59 provided on the moving table 10 serves to prevent transmission of any vibration from the rotary plate 42 to the disc-shaped film unit 20.

Further, the vibration of the driving unit 120 is shut off by the resilient member 59; therefore, the vibration transmitted to the printing station 16 through the arm is also reduced.

When the operation at the information processing station 14 has been completed, the disc-shaped film unit 20 is returned back to its initial rotational position shown in FIG. 12. Then, the solenoid 81 is de-energized, whereby the lever 72 returns to the solid-line position shown in FIG. 5, thereby fixing the support shaft 60. Simultaneously, the swing bracket 124 is lowered, thus causing the rotary plate 42 to rotate again such as to move to the printing station 16. By the movement of the rotary plate 42 from the information processing station 14 to the printing station 16, the disc-shaped film unit 20 horizontally moved is inserted into the slit 172 in the printing station 16.

In the printing station 16 also, the disc-shaped film unit 20 is sequentially rotated by the rise and rotation of the driving unit 120, whereby the image frames 26 successively coincide with the aperture 174, thereby allowing the image plane 178 to be formed on the photographic paper 176. In this case, it is possible to speedily effect the printing operation at the printing station 16, since information, such as the number of prints to be produced and the printing condition correction data, has already been transmitted to the printing station 16 from the information processing station 14. It is also possible to obtain the signals representing printing condition correction data and other information by reading out the same from the hub 22 at the printing station 16 rather than by receiving the signals from the information processing station 14.

In the printing operation, it is possible to make the desired image frame coincident with the operation axis P with accuracy, since a slight rotation of the disc-shaped film unit 20 from the position shown in FIG. 12 allows the image frame $26_1$ or $26_{15}$ to coincide with the operation axis P and also permits the distal end of the arm 300 to engage with one of the recesses 28 so as to prevent rotation of the disc-shaped film unit 20. When printing of one image frame has been completed, the arm 300 is driven by the solenoid 308, so that the disc-shaped film unit 20 is rotated, and the distal end of the arm 300 engages with a subsequent recess 28. When the engagement is detected, the rotation of the disc-shaped film unit 20 is suspended. Thereupon, a subsequent image frame is coincident with the operation axis P, and a printing operation is carried out in a similar manner. Thereafter, a similar printing operation is successively repeated.

It is to be noted that the engaging distal end of the arm 300 is tapered, whereas each of the recesses 28 formed along the outer periphery of the disc-shaped film unit 20 is rectangular. Therefore, when positioning is effected by the arm 300, it is possible to suspend the rotation of the disc-shaped film unit 20 without any play by engaging the tapered distal end of the arm 300 with the opening edge of one of the recesses 28.

During the above-described operations on the disc-shaped film unit 20 at the information processing station 14 and the printing station 16, the moving table 10 is supported by the support shaft 60 through the resilient member 59. Therefore, any vibration transmitted from other portion of the apparatus is properly absorbed by the resilient member 59, thereby allowing an accurate operation.

At the time when printing of all the image frames 26 of the disc-shaped film unit 20 has been completed, the operation at the printing station 16 is ended. Then, the disc-shaped film unit 20 is returned back to its initial rotational position shown in FIG. 12 and is fixed therein. The moving table 10 is then moved to the film unloading station 18 by rotation of the brackets 44.

Before the moving table 10 has moved above the film unloading station 18, the elevating plate 110 has been previously raised, whereby the conical member 90 of the moving table 10 having moved to the film unloading station 18 comes to rest above the spindle 104 of the unloaded-film container 180. Hereupon, the elevating plate 110 is lowered, so that the conical member 90 is coupled to the upper end of the spindle 104.

Next, the lever 72 is pivoted about the pin 76 by a large angle by the driving force of the solenoid 81. Consequently, the release fork 83 pushes out the disc-shaped film unit 20 from the support shaft 60 and lowers the disc-shape film unit 20 such that it is placed on the end plate 181 inside the unloaded-film container 180.

When the disc-shaped film unit 20 has been unloaded from the support shaft 60 at the film unloading station 18, the elevating plate 110 is raised again. Consequently, the moving table 10 is pushed up by the elevating plate 110 such as to separate from the spindle 104 inside the container 180 and is then returned to the film loading station 12 by rotation of the rotary plate 42. At the film loading station 12, after the conical member 90 is coupled to the upper end of the spindle 104 by lowering of the elevating plate 110, an operation is commenced for taking out a disc-shaped film unit 20 from the film container 102.

Thereafter, the above-described operation is repeated a plurality of times, and each of the disc-shaped film units 20 is taken out from the film loading station 12 and subjected to a printing operation and is then moved to the film unloading station 18, where the disc-shaped film unit 20 is unloaded. At the film unloading station 18, fitting of a plurality of disc-shaped film units 20 on the spindle 104 causes the end plate 181 to lower below the guide brackets 182, 184. However, since the respective outer peripheries of the disc-shaped film units 20 between the guide brackets 182, 184 abut against the retainer arms 192 of the stopper pawls 186, there is no possibility that the upper end portion of the spindle 104 may be radially displaced even after the moving table 10 has separated from the spindle 104. Accordingly, it is possible to smoothly effect a subsequent disc-shaped film unit inserting operation.

The unloaded-film container 180 filled up with the disc-shaped film units 20 and the film container 102 emptied of the disc-shaped film units 20 are respectively replaced with spare containers, and then, the operation is continued.

Although, in the above-described embodiment, the elevating plate 110 is employed as an elevating means, any means may be employed if it is able to vertically move the moving table 10 in relation to the stations, and the source of the driving force therefor is not especially limited to the solenoid.

It is to be noted also that, although, in the above-described embodiment, the structure for retaining the disc-shaped film unit 20 is constituted by the balls 100 and the compression coiled spring 94, any means is applicable if it is able to reliably retain the disc-shaped film unit 20 on the support shaft 60. Further, although the above-described driving unit 120 is adapted to couple to the support shaft 60 by being raised by pivoting of the swing bracket 124 about the horizontal pin 122, a structure may be employed in which the driving shaft 140 moves vertically. Moreover, the driving shaft 140 is not exclusively coupled to the support shaft 60 and may be coupled to the smaller-diameter support shaft 86. Further, it is not exclusive that the driving unit 120 is coaxially coupled to the support shaft 60 and the smaller-diameter support shaft 86, and the structure of the driving unit 120 may be such that the outer peripheral surface of the support shaft 60 or the smaller-diameter support shaft 86 and the outer peripheral surface of the driving shaft 140 are coupled together in such a manner as engagement between a pair of external gears, thereby transmitting a driving force. Further, although the solenoid 81 is employed to pivot the lever 72 in the embodiment, the lever 72 may be pivoted in response to the vertical movement of the swing bracket 124.

Furthermore, in the above-described embodiment, the present invention is applied to the positioning apparatus for effecting printing of a disc-shaped film unit. The invention is, however, widely applicable not only to printing apparatuses but also to other various apparatuses, such as an apparatus for inputting and outputting information in relation to the hub of a disc-shaped film unit, an apparatus (viewer) for projecting an image formed on the film disk and examining the same, and an apparatus in which an image sensor, such as an image pickup tube, is provided in place of the photographic paper 176 so as to record an image on a magnetic recording medium, an optical disc or other recording medium. In addition, the invention is applicable not only to the film unloading station but also to other stations in these apparatuses, such as the film loading station.

What is claimed is:

1. A disc-shaped film unit positioning apparatus for successively moving a disc-shaped film unit to stations disposed around a central axis of said apparatus, the film unit having a plurality of images circularly disposed thereon, said apparatus comprising:
    (a) a plurality of moving tables disposed around said central axis;
    (b) a support shaft which is rotatably supported on each of said moving tables such as to be in parallel to said central axis and fitted with a hub bore of said disc-shaped film unit;
    (c) a spindle which is provided on a predetermined one of said stations and is fitted with the hub bore of said disc-shaped film unit;
    (d) coupling means for coaxially coupling together said spindle and said support shaft, said coupling means comprising means for fitting one of said spindle and said support shaft into the other of said spindle and said support shaft;
    (e) transferring means for smoothly transferring said disc-shaped film unit between said spindle and said support shaft; and
    (f) elevating means for axially moving said support shaft away from said spindle before moving said support shaft to a subsequent station by being rotated about said central axis, said elevating means comprising: a roller which vertically moves with one of said moving tables; an elevating plate which defines a guide passage for said roller about said central axis; and means for vertically driving said elevating plate.

2. The apparatus according to claim 1, wherein one of said spindle and said support shaft includes a tapered recess, and the other of said spindle and said support shaft has a tapered projection such as to fit with said tapered recess, said tapered recess and projection in combination allowing said spindle and said support shaft to be coaxial with each other when coupled together.

3. The apparatus according to claim 1, further including a cylindrical container disposed coaxially around said spindle for storing said disc-shaped film unit fitted on said spindle.

4. The apparatus according to claim 3, further including a plurality of stopper pawls provided at an upper end of said container, said stopper pawls projecting into the passing locus of said disc-shaped film unit for preventing said film unit from coming off from said container.

5. The apparatus according to claim 1, further including a plurality of arms radially projecting from said central axis, said moving tables being positioned at respective distal end portions of said arms.

6. The apparatus according to claim 1, wherein each of said moving tables includes retainer means for retaining said disc-shaped film unit after said unit is transferred from said spindle.

7. The apparatus according to claim 6, wherein said disc-shaped film unit retainer means includes at least one ball which is projected by a biasing force in the radial direction of said support shaft such as to prevent said disc-shaped film unit from coming off.

8. The apparatus according to claim 6, further including cancelling means for removing said disc-shaped film unit from said support shaft.

9. The apparatus according to claim 8, wherein said cancelling means includes means for pushing out said disc-shaped film unit in the axial direction of said spindle, thereby removing said film unit from said support shaft.

10. The apparatus according to claim 9, wherein said means for pushing includes a lever which is pivotally supported by said arm for removing said disc-shaped film unit from said support shaft by pivoting.

11. The apparatus according to claim 1, wherein each of said moving tables includes means for preventing rotation of said disc-shaped film unit fitted on said support shaft.

12. The apparatus according to claim 11, wherein said means for preventing rotation of said disc-shaped film unit includes means for allowing an intermediate position between the adjacent image frames on said disc-shaped film unit to be coincident with an operation axis of each of said stations.

13. The apparatus according to claim 12, wherein said means for preventing rotation of said disc-shaped film unit includes means for preventing rotation of a stopper ring which is attached to said support shaft.

14. The apparatus according to claim 13, wherein said means for preventing rotation of said stopper ring which is attached to said support shaft includes a lever which moves in the axial direction of said support shaft and engages with said stopper ring, thereby preventing rotation of said support shaft.

15. The apparatus according to claim 14, wherein some of said stations include cancelling mens for driving said lever, whereby engagement between said lever and stopper ring is cancelled, thereby allowing rotation of said support shaft.

16. The apparatus according to claim 12, wherein at least one of said stations is provided with an arm which selectively engages with a plurality of positioning recesses formed along the outer periphery of said disc-shaped film unit at a predetermined spacing, thereby preventing rotation of said disc-shaped film unit.

17. The apparatus according to claim 16, wherein said arm engages with one of said positioning recesses such as to prevent rotation of said disc-shaped film unit when each image frame is made coincident with said operation axis of said at least one of said stations.

18. The apparatus according to claim 1, further including a plurality of arms extending radially from said central axis, a corresponding one of said moving tables being connected to a distal end of a respective one of said arms, wherein vibration absorbing means is disposed between said support shaft and said arm which radially projects from said central axis and is provided at its distal end portion with the corresponding one of said moving tables.

19. The apparatus according to claim 1, further comprising driving means which is disposed at some of said stations and is coupled to said support shaft of each said moving table so as to rotate said support shaft.

20. The apparatus according to claim 19, wherein said driving means includes a driving shaft employed for coupling to said support shaft, said driving shaft being formed at its distal end portion with radially extending recesses for engagement with a key formed at the distal end of said support shaft.

21. The apparatus according to claim 19, further including a swing bracket, said driving means being attached to said swing bracket which swings about the center of rotation.

22. The apparatus according to claim 21, wherein said swing bracket includes a notch for allowing passage of an arm which approaches said disc-shaped film unit on said support shaft in order to effect inputting or outputting of information.

23. The apparatus according to claim 21, further including a cam, and a motor for driving said cam, wherein said swing bracket is raised by rotation of said cam, thereby allowing said driving shaft to couple to said support shaft.

24. The apparatus according to claim 1, wherein said predetermined station includes an end plate which vertically moves along said spindle so as to mount thereon said disc-shaped film unit.

25. The apparatus according to claim 24, wherein said spindle has a guide bracket which is disposed at the upper end thereof such as to support the outer periphery of said end plate as it is lowered, thereby reinforcing said spindle.

26. The apparatus according to claim 25, further including a plurality of guide members attached to said guide bracket disposed opposite the outer periphery of the upper end portion of said spindle and abutting against the outer peripheral portion of said disc-shaped film unit fitted on the upper end of said spindle.

27. The apparatus according to claim 26, wherein said guide members respectively have retainer arms which project therefrom in parallel to the axis of said spindle so as to abut against the outer peripheral portion of said disc-shaped film unit.

28. The apparatus according to claim 27, wherein each of said retainer arms comprises a resilient member.

29. The apparatus according to claim 28, wherein each of said retainer arms is formed with projections and recesses which correspodd to the pitch of disc-shaped film units fitted on said spindle.

30. The apparatus according to claim 27, wherein said end plate is formed with one notch for each of said retainer arms, for avoiding any interference with said retainer arms.

31. The apparatus according to claim 27, wherein said retainer arms in combination define an inscribed envelope circle which has a diameter slightly smaller than the outside diameter of said disc-shaped film unit.

32. A disc-shaped film unit positioning apparatus for processing a disc-shaped film unit having a plurality of images circularly disposed thereon. said appartaus comprising:
 (a) a moving table rotated about a central axis of said apparatus, and an arm extending radially from said central axis and connected to said moving table, said moving table including retainer means for retaining said disc-shaped film unit when it is transferreed from said spindle, said retainer means including a ball which is projected by a biasing force in the radial direction of said support shaft such as to prevent said disc-shaped film unit from coming off, said arm including a lever, pivotally supported by said arm, for removing said disc-shaped film unit from said support shaft by pivoting, said lever pushing out said disc-shaped film unit in the axial direction of said spindle, thereby removing said film unit from said support shaft;
 (b) a support shaft provided on said moving table and fitted with a hub bore in said disc-shaped film unit;
 (c) a film loading station having a spindle fitted with a plurality of disc-shaped film units;
 (d) a work station provided with a driving shaft which is coupled to said supported shaft of said moving table when raised;
 (e) a film unloading station having an unloaded-film container which is axially provided with a spindle for fitting thereon said disc-shaped film unit;
 (f) coupling means which is formed between said spindle of each station and said support shaft of said moving table such as to coaxially couple together said spindle and said support shaft, thereby allowing transfer of said disc-shaped film unit; and
 (g) elevating means which raises said support shaft when said moving table is rotated so as to cancel the coupling between said support shaft and said spindle such that any interference between said spindle and said support shaft is avoided during rotation of said moving table.

33. The apparatus according to claim 32, wherein said coupling means has a structure in which either one of said spindle and said support shaft is fitted into the other.

34. The apparatus according to claim 33, wherein said coupling means includes a tapered recess formed on either one of said spindle and said support shaft and a tapered projecton formed on the other such as to fit with said tapered recess, said tapered recess and projection in combination allowing said spindle and said support shaft to be guided such as to be coaxial with each other when coupling together.

35. The apparatus according to claim 32, wherein said moving table includes means for preventing rotation of said disc-shaped film unit fitted on said support shaft, said means allowing an intermediate position between the adjacent image frames on said disc-shaped film unit to be coincident with an operation axis of each of said stations.

36. The apparatus according to claim 35, wherein said means for preventing rotation of said disc-shaped film unit includes means for preventing rotation of a stopper ring which is attached to said support shaft, said means for preventing rotation of said stopper ring also preventing rotation of said support shaft by engagement between said stopper ring and a lever which moves in the axial direction of said support shaft.

37. The apparatus according to claim 32, further including vibration absorbing means comprising a resilient member disposed such as to abut against the outer periphery of said support shaft, thereby permitting slight radial movement of said support shaft.

38. The apparatus according to claim 32, further comprising a driving unit which is disposed at said work station and is coupled to said support shaft of said moving table so as to rotate said support shaft, said driving means having a driving shaft employed for coupling to said support shaft, said driving shaft being formed at its distal end portion with radially extending recesses for engagement with a key formed at the distal end of said support shaft.

39. A disc-shaped film unit positioning apparatus for successively moving a disc-shaped film unit to a loading station, a work station and an unloading station by rotting said film unit about a central axis of said apparatus, said apparatus comprising:
 (a) a rotary plate disposed at said central axis for rotating about said central axis;
 (b) a plurality of arms radially projecting from said rotary plate;
 (c) a support shaft rotatably supported at the distal end portion of each of said arms and fitted with a hub bore of said disc-shaped film unit;
 (d) retainer means provided on said support shaft to retain said disc-shaped film unit fitted on said support shaft;
 (e) a spindle, for fitting thereon said disc-shaped film unit, provided at each of said loading and unloading stations;
 (f) coupling means which is provided between said spindle and said support shaft for coupling togehter said spindle and said support coaxially with each other by fitting one of them into the other, said coupling means including a tapered recess formed on either one of said spindle and said support shaft and a tapered projection formed on the other for fitting into said tapered recess, said tapered recess and projection in combination allowing said spindle and said support shaft to be guided coaxially with each other when coupling together;
 (g) means for transferring said disc-shaped film unit from said spindle to said support shaft support shaft while specifying the rotational position of said disc-shaped film unit about said support shaft; and
 (h) elevating means for axially moving said support shaft for separation from said spindle during movement of said moving table about said central axis, said elevating means including a roller, vertically movable with said support shaft, an elevating plate for defining a guide passage for said roller about said central axis, and means for vertically driving said elevating plate.

40. The apparatus according to claim 39, wherein said elevating plate is provided at a longitudinal end with a slanting surface which serves to smoothly move said moving table vertically as it is rotated about said central axis.

41. A disc-shaped film unit positioning apparatus for successively moving a disc-shaped film unit to stations disposed around a central axis of said apparatus, the film unit having a plurality of images circularly disposed thereon, said apparatus comprising:

(a) a plurality of moving tables disposed around said central axis;
(b) a support shaft which is rotatably supported on each of said moving tables such as to be in parallel to said central axis and is fitted with a hub bore of said disc-shaped film unit;
(c) a spindle which is provided on a predetermined one of said stations and is fitted with the hub bore of said disc-shaped film unit;
(d) coupling means for coaxially coupling together said spindle and said support shaft;
(e) transferring means for smoothly transferring said disc-shaped film unit between said spindle and said support shaft; and
(f) vibration absorbing means comprising a leaf spring bent in zig-zag and positioned about an outer periphery of said support shaft for absorbing horizontal and vertical vibration during motion of said moving tables.

* * * * *